United States Patent [19]

Horansky et al.

[11] Patent Number: 4,995,660
[45] Date of Patent: Feb. 26, 1991

[54] MOUNTING STRUCTURE FOR VEHICLE BUMPER ASSEMBLY

[75] Inventors: John Horansky, Troy; Kenneth L. Winalis, Clemens, both of Mich.

[73] Assignee: Chyrsler Corporation, Highland Park, Mich.

[21] Appl. No.: 535,001

[22] Filed: Jun. 7, 1990

[51] Int. Cl.⁵ .............................................. B60R 19/26
[52] U.S. Cl. .................................... 293/132; 293/155
[58] Field of Search ................ 293/132, 134, 135, 155

[56] References Cited

U.S. PATENT DOCUMENTS

| | | | |
|---|---|---|---|
| 4,160,561 | 7/1979 | Farnam et al. | 293/1 |
| 4,465,312 | 8/1984 | Werner | 293/132 |
| 4,770,453 | 9/1988 | Reynolds | 293/119 |
| 4,829,979 | 5/1989 | Moir | 293/155 X |
| 4,830,418 | 5/1989 | Gest | 293/155 X |
| 4,913,268 | 4/1990 | Parker et al. | 293/134 X |

*Primary Examiner*—Dennis H. Pedder
*Assistant Examiner*—Gary C. Hoge
*Attorney, Agent, or Firm*—Edward A. Craig

[57] ABSTRACT

Adjustment means are provided to properly position a vehicle bumper assembly. The vehicle bumper assembly includes bumper structure and energy absorbing devices which mount it to vehicle structure. The adjustment means includes bracket structure having enlarged and elongated mounting opening means and oversize bracket part relationships which permit positioning the bumper assembly as desired to accommodate minor dimensional variations in the build of the vehicle.

7 Claims, 3 Drawing Sheets

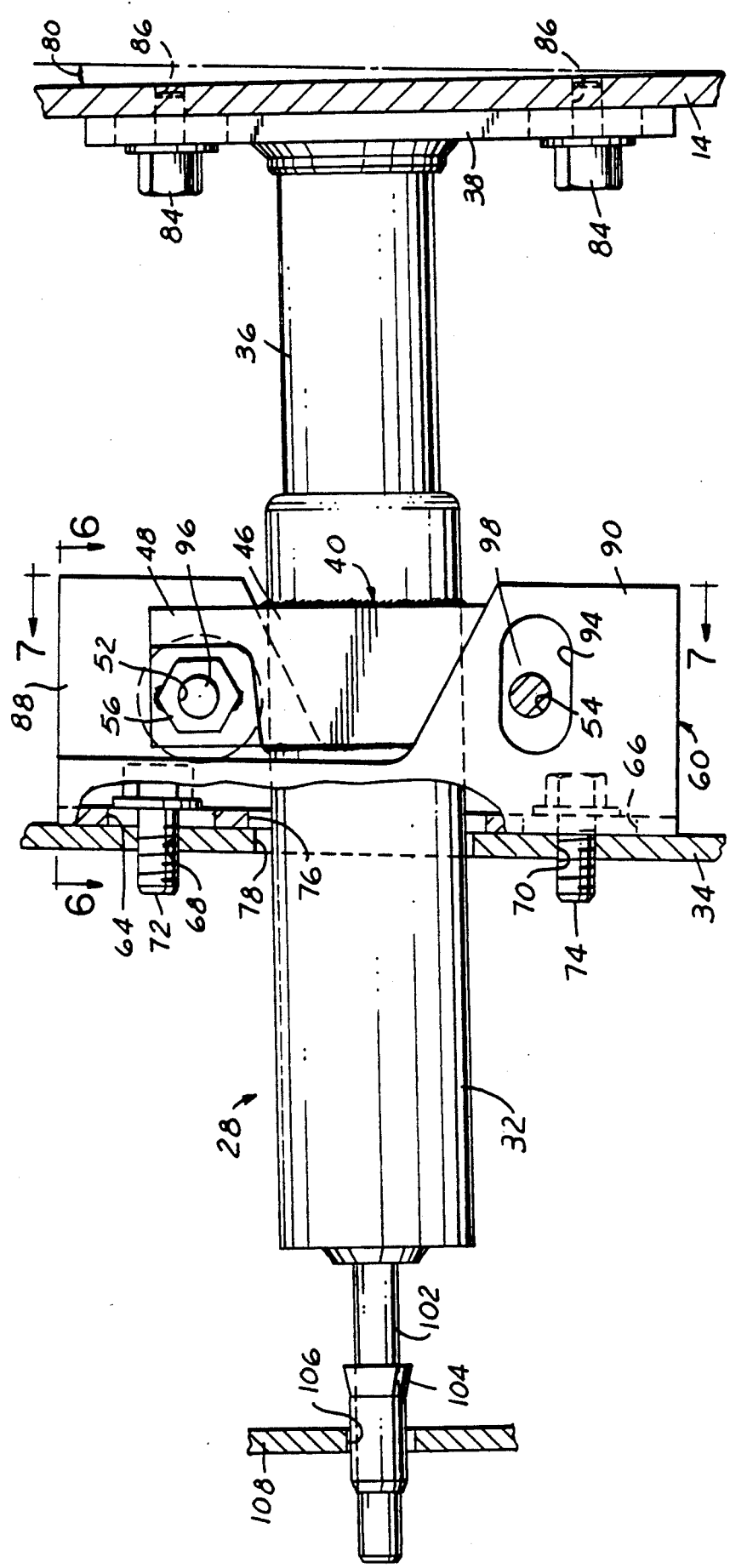

MOUNTING STRUCTURE FOR VEHICLE BUMPER ASSEMBLY

BACKGROUND OF THE INVENTION

1. Field of Invention:

The invention relates to mounting structure for a vehicle bumper assembly which permits desired positionment of the bumper assembly with respect to the main vehicle structure while taking into account minor dimensional variations in the vehicle build.

2. Prior Art:

Government regulations have mandated that front and rear bumpers of vehicles be so constructed and mounted as not to be damaged as a consequence of low speed impact with other vehicles or fixed structure. The prevailing method for accomplishing this is to mount the bumper onto a vehicle by means of an energy absorbing device, such as a shock absorbing structure. When the bumper is impacted at low speeds, the energy absorbing device collapses, absorbing the energy of impact. This collapse takes with it the bumper which moves towards the vehicle. After being impacted, the energy absorbing devices bias the bumper back to its normal position.

One problem which has been encountered in connection with the mounting of vehicle bumper assemblies including energy absorbers has been proper alignment of the bumper assembly with other portions of the vehicle. When a vehicle is assembled, there is normally a minor dimensional variation from the norm. This is due to the fact that a vehicle build includes many interfitting parts. This problem has been particularly acute with respect to alignment of the end portions of the bumpers with fender structure of a vehicle. Modern perceptions of "fit and finish" do not permit the existence of any substantial gaps between adjacent outer body panels. One method for adjusting the positionment of the bumper has been the use of shims between the energy absorbers and the bumper structure. This technique is discussed in U.S. Pat. No. 4,160,561, entitled "Vehicle Bumper Shim and Method".

Another technique which has been employed to eliminate the appearance of a gap between the bumper structure and vehicle fenders has been to provide a flexible panel portion on each end of the bumper. This flexible portion has been long enough to extend slightly over the adjacent vehicle fenders so that even if the bumper structure is not close enough to the fenders to prevent the presence of a gap, the gap is covered by the overlapping panel structure. This is objectionable from a style standpoint because it adds an extra vertical line to the vehicle body structure which is not part of the coordinated design intended by the stylist. Alternately, overlap has been avoided by directly attaching the flexible panels to the fender. However, this has sometimes resulted in objectionable appearance (wrinkles or bulges) or has required a floating attachment of the bumper facia to a bumper beam.

An alternate means for mounting the bumper assembly by use of support structure including threaded means which permit forward or rearward adjustment of the bumper assembly as desired has been proposed, as for example in U.S. Pat. No. 4,770,453. While such a technique is useful, the adjustment is possible in one direction while unfortunately dimensional variation in vehicle build is three dimensional.

The present invention provides a means for mounting the bumper assembly which accommodates three dimensional variations in vehicle build. This is accomplished by the use of elongated mounting slots, enlarged openings and oversize mounting bracket structure.

SUMMARY OF THE INVENTION

The present invention is for use in a vehicle bumper assembly which comprises a bumper structure for receiving impact forces and at least one energy absorbing device secured between the bumper structure and vehicle support structure to mount the bumper structure. The energy absorbing device includes a cylinder detachably fastened to the vehicle support structure. The cylinder has a piston slidably received therewithin. The piston is detachably fastened at an outer end to the bumper structure.

Mounting structure is provided for detachably fastening the cylinder to the vehicle support structure. The mounting structure compensates for variations in the orientation of the bumper structure with respect to the vehicle support structure. The mounting structure includes a cylinder bracket fixedly secured to the cylinder. The cylinder bracket includes at least one arm extending outwardly from the cylinder. Preferably, the cylinder bracket includes a pair of substantially parallel spaced apart arms extending outwardly from the cylinder from diametrically opposed sides of the cylinder in opposite directions. Each of the arms has an opening therein.

A support bracket is provided. The support bracket includes a wall which has a first cylinder therein of larger diameter than the cylinder. The vehicle support structure has a second cylinder opening therein of larger diameter than the cylinder. Means are provided detachably fastening the support bracket to the vehicle support structure with the first and second cylinder openings in substantial registry. The cylinder extends through the first and second cylinder openings at a location and angle limited by the diameters thereof.

The means for detachably fastening the support bracket to the vehicle support structure include the above-mentioned wall having at least one vertically oriented elongated mounting opening therein. The vehicle support structure has at least one bracket opening therein. Fastening means extend through the mounting opening and bracket opening to secure the cylinder bracket in place with the mounting opening permitting vertical adjustability of the cylinder bracket.

The wall has at least one arm extending outwardly therefrom. Preferably, the wall of the support bracket has a pair of spaced apart substantially parallel arms extending outwardly therefrom in the same direction. Each of these arms has a horizontally oriented elongated mounting opening therein. Fastening means extend through the mounting opening in each support bracket arm and the opening in one of the cylinder bracket arms to secure the cylinder support bracket with the mounting openings in the support bracket arms permitting horizontal adjustability of the cylinder. Preferably, the elongated mounting openings in the support bracket arms are vertically wider than the fastening means extending therethrough to permit vertical adjustability of the cylinder. Desirably, the pair of arms extending outwardly from the cylinder are spaced apart a distance which is less than the distance that the arms extending outwardly from the wall of the support bracket are spaced apart. The pair of arms extending outwardly from the cylinder being received between the arms extending outwardly from the wall of the support bracket thereby permitting adjustability of said pairs of arms with respect to each other.

Desirably, the first cylinder opening has a larger diameter than the second cylinder opening thereby permitting minor displacement of the center of the first cylinder opening with respect to the center of the second cylinder opening to result in substantial registry while still providing an opening means for the cylinder to extend through which is of larger diameter than the cylinder.

Preferably, the wall of the support bracket has two vertically oriented elongated mounting openings therein. The vehicle support structure also has two bracket openings therein. Fastening means are provided extending through these mounting openings and bracket openings to secure the cylinder bracket in place with the mounting openings permitting vertical adjustability of the cylinder bracket.

DESCRIPTION OF THE DRAWINGS

FIG. 4 is a sectional view taken substantially along the line 4—4 of FIG. 1 looking in the direction of the arrows;

DESCRIPTION OF THE PREFERRED EMBODIMENT

Figure 3:
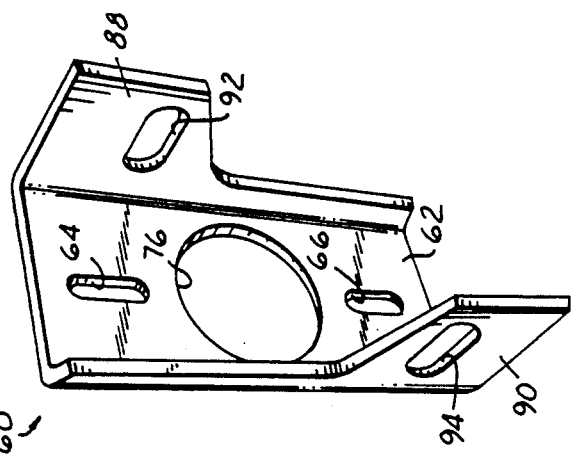
FIG. 3 is a view in perspective of a support bracket utilized in mounting the vehicle bumper assembly.
Figure 1:
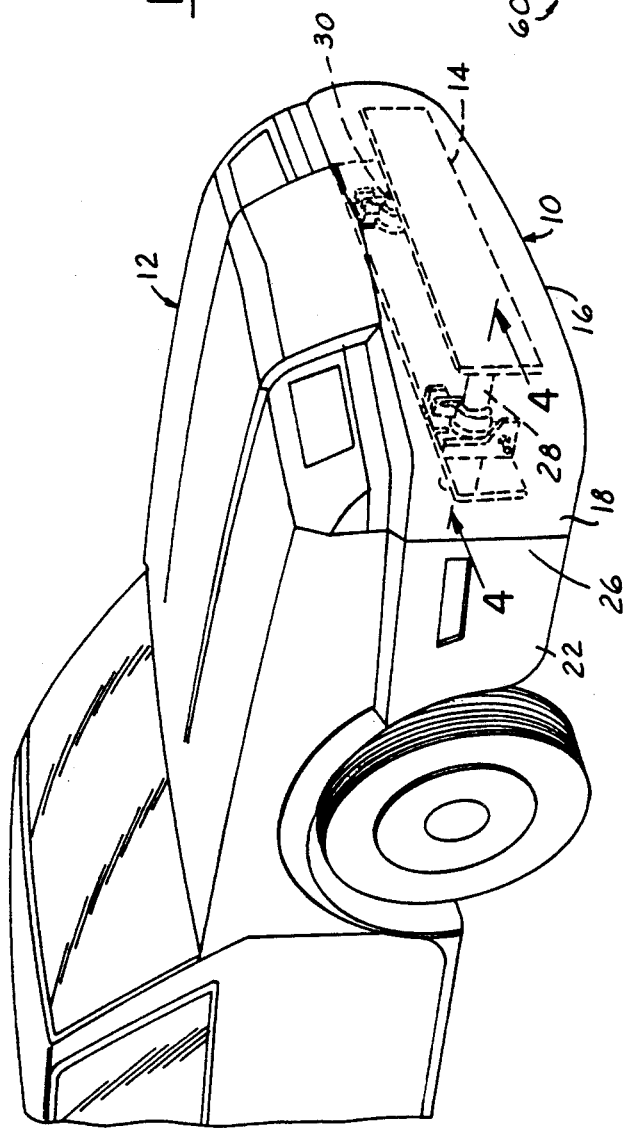
FIG. 1 is a view in perspective of a vehicle illustrating one embodiment of the vehicle bumper assembly of the present invention mounted on the front end thereof.
Figure 2:
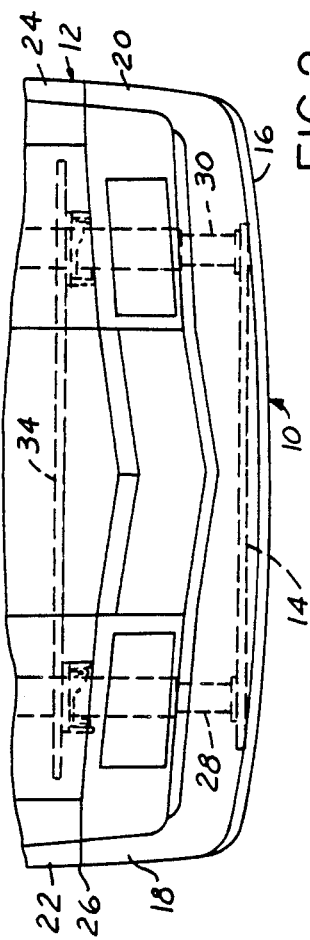
FIG. 2 is a top plan view of the front end portion of the vehicle of FIG. 1.
Figure 5:
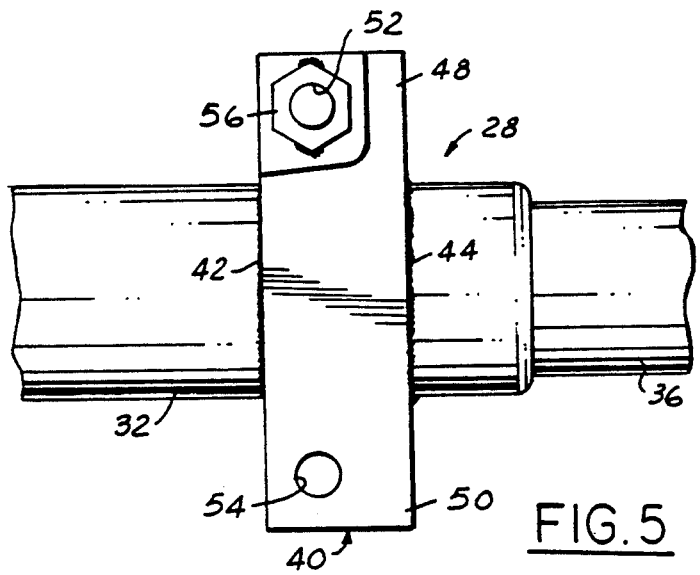
FIG. 5 is a partial view in elevation of the energy absorbing device utilized to mount the vehicle bumper assembly illustrating the cylinder bracket utilized in mounting the cylinder.

Referring to FIGS. 1 and 2, it will be noted that a vehicle bumper assembly 10 is mounted on the front end of a vehicle 12, shown as an automobile. The vehicle bumper assembly 10 may, however, be mounted on other vehicle forms, such as light trucks, vans and the like. Additionally, the vehicle bumper assembly 10 may be mounted on the rear of the vehicle 12 as well as on the front.

The vehicle bumper assembly 10 includes a conventional bumper beam 14 which functions as a structural member for receiving impact forces which may be encountered as a consequence of hitting another vehicle or a fixed object. The bumper beam 14 has fixed thereto a soft bumper facia 16 which is essentially ornamental. As will be noted, the facia 16 extends across the front of the vehicle 12 and has end portions 18, 20 which extend around the sides of the vehicle for a short distance. The end portions 18, 20 may be longer or shorter than illustrated. They terminate at the edge of sheet metal defining fenders 22, 24. A line 26 is defined at this juncture. Portions 18, 20 are conventionally attached to fenders 22, 24 at juncture 26.

A pair of spaced apart energy absorbing devices 28, 30 are secured to the bumper beam 14 to complete the vehicle bumper assembly 10. The energy absorbing devices bias the bumper structure to a normal position as shown in the figures. Each energy absorbing device comprises a cylinder 32 which is detachably fastened to vehicle support structure 34, the structure 34 being a structural rail forming part of the vehicle framing. A piston 36 is slidably received in the cylinder 32. The piston 36 is detachably fastened at the outer end 38 thereof to the bumper beam 14. As is common in the art, means are provided within the cylinder 32 to absorb energy upon impact of the bumper which results in subsequent movement of the piston 36 into the cylinder 32. The energy absorbing means may be hydraulic, pneumatic, a compressible composition, such as a springy plastic material, or the like. The specific type of energy absorbing device in not germane to the present invention, the present invention functioning with various styles of such devices. The energy absorbing devices permit movement of the bumper a short distance towards the vehicle on which they are mounted after a low speed impact with another vehicle or stationary structure without appreciable damage to the bumper structure. After the impacting force is dissipated, the bumper structure is returned to its original position by the energy absorbing devices. As above mentioned, such bumper mounting constructions are common in the automotive industry at this time.

Mounting structure is provided for detachably fastening the cylinder 32 to the vehicle support structure 34. The mounting structure compensates for variations in the orientation of the bumper structure with respect to the vehicle support structure. These variations occur in the building of the vehicle as a consequence of the numerous different parts which are assembled together to form the vehicle. It is not possible to make each vehicle exactly match the norm with respect to dimensions. The variations are not large, generally being in the order of less than ¼ inch in any direction.

The mounting structure includes a cylinder bracket 40 which is fixedly secured to the cylinder as by welding as noted at 42, 44. The cylinder bracket 40 includes a central cylindrical portion 46 from which a pair of substantially parallel spaced apart arms 48, 50 extend outwardly from the cylinder 32 from diametrically opposed sides of the cylinder in opposite directions. An opening 52, 54 is provided in each arm 48, 50. An internally threaded nut 56, 58 is welded to the reverse face of each arm in registry with one of the openings 52, 54.

A support bracket 60 is provided for attachment to the vehicle support structure 34. The support bracket 60 fixedly mounts the cylinder 32 of the energy absorbing devices 28, 30 to prevent the cylinders from movement and firmly mount the vehicle bumper assembly 10.

The support bracket 60 includes a wall 62 which has two vertically oriented elongated mounting openings 64, 66 therein. The vehicle support structure 34 has two internally threaded bracket openings 68, 70 therein. A threaded screw 72, 74 extends through each of the elongated openings 64, 66 into threaded engagement with one of the openings 68, 70 to thereby securely mount the support bracket 60 to the vehicle support structure 34. The elongated openings 64, 66 permit vertical adjustability of the support bracket 60 and, thus, the cylinder bracket 40 as desired and necessary to conform to the dimensional configuration of the vehicle.

The support bracket wall 62 has a first cylinder opening 76 therein. This opening is of larger diameter than the cylinder 32. The vehicle support structure 34 has a second cylinder opening 78 therein of larger diameter than the cylinder 32. As will be noted in FIG. 4, the first cylinder opening 76 is of somewhat larger diameter than the second cylinder opening 78. It is desired that the openings 76, 78 be in substantial registry. However, it is possible to shift the support bracket 60 upwardly or downwardly (as a consequence of the openings 64, 66 being elongated). Thus, in some cases, the cylinder opening 76 may not be in exact registry with the cylinder opening 78. This is illustrated in FIG. 4 wherein it will be noted that the cylinder 32 is oriented at a slight downward angle as a consequence of the angle indicated at 80 which the bumper beam 14 makes with the vertical plane. The piston 36 has a plate on the outer end thereof with openings therethrough permitting threaded screws 84 to pass therethrough into engagement with threaded openings 86 provided in the bumper beam 14. As a consequence, the plate 82 will assume the orientation of the bumper beam thereby resulting in the slight downward angulation of the energy absorbing device 28 indicated. This will require the support bracket 60 to be moved somewhat downwardly thereby shifting the center of the first cylinder opening 76 downwardly with respect to the center of the second cylinder opening 78 as illustrated in FIG. 4. However, the minor displacement of the center of the first cylinder opening with respect to the center of the second cylinder opening still results in substantial registry of the openings and provides an opening means for the cylinder 32 to extend through which is of larger diameter than the cylinder which is needed to accommodate the desired downward angulation of the cylinder illustrated in FIG. 4. As will be appreciated, this angulation could also be upwardly or sidewardly. Consequently, the cylinder can extend through the first and second cylinder openings at a location and angle limited only by the diameters of the openings.

The wall 62 of the support bracket 60 has a pair of spaced apart substantially parallel arms 88, 90 extending outwardly therefrom in the same direction. Each of these arms has a horizontally oriented elongated mounting opening 92, 94 therein. A threaded screw 96, 98 extends through each of these openings into threaded engagement with one of the nuts 56, 58 provided on the support bracket arms 48, 50 to thereby secure the cylinder 32 in place. As will be appreciated, the elongation of the mounting openings 92, 94 permits horizontal adjustability of the cylinder 32 with respect to the support bracket 60.

The mounting openings 92, 94 are vertically wider than the diameter of the screws 96, 98. This permits some vertical adjustability of the cylinder with respect to the support bracket 60.

Figure 6:
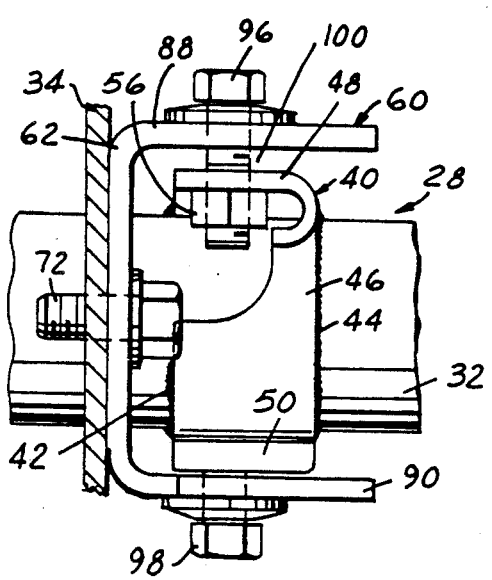
FIG. 6 is a sectional view taken substantially along the line 6—6 of FIG. 4 looking in the direction of the arrows.
Figure 7:
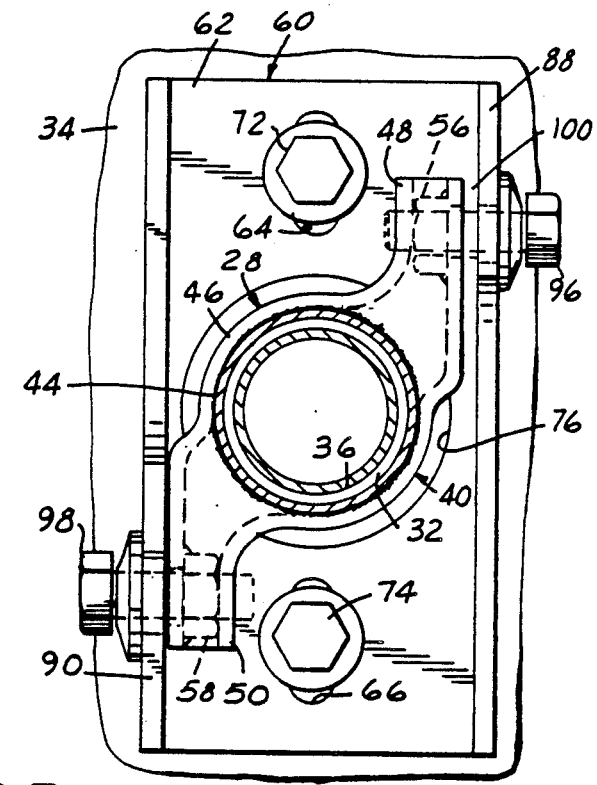
FIG. 7 is a sectional view taken substantially along the line 7—7 of FIG. 4 looking in the direction of the arrows.

The arms 48, 50 extending outwardly from the cylinder 32 are spaced apart a distance which is less than the distance that the arms 88, 90 are spaced apart. The arms 48, 50 are received between the arms of 88, 90. There is thus a space indicated at 100 in FIGS. 6 and 7 between the arms 48, 50 and arms 88, 90. This permits angular and horizontal adjustability of the arms 48, 50 with respect to the arms 88, 90.

As will be noted in FIG. 4, the cylinder 32 extends beyond support structure 34 and terminates in a stem 102. The stem 102 has an isolator cap 104 thereon, the cap 104 being preferably fabricated of a plastic material.

The cap 104 is slidingly received in an opening 106 provided in vehicle support structure 108. This structure acts as stabilizing means for the energy absorbing devices, it being appreciated that each energy absorbing device 28, 30 is mounted in like manner, thus ensuring proper alignment of the bumper structure and proper action of the energy absorbing devices when needed. During adjustment of the bumper assembly, the cap 104 is free to slide in the opening 106 to accommodate axial movement of the energy absorbing device.

As will be appreciated from the above description, the various enlarged, elongated and over-sized mounting holes and structure permit a wide range of adjustability of the energy absorbing device 28 with respect to the vehicle support structure 34, thus accommodating a variation in the orientation of the bumper beam 14 with the vehicle support structure 34. This variation will normally not be very great, but can be troublesome with respect to achieving an external vehicle appearance which does not include gaps.

We claim:

1. In a vehicle bumper assembly comprising a bumper structure for receiving impact forces, at least one energy absorbing device secured between the bumper structure and vehicle support structure to mount said bumper structure, the energy absorbing device including a cylinder detachably fastened to said vehicle support structure, a piston slidably received within the cylinder, the piston being detachably fastened at an outer end thereof to the bumper structure, the improvement comprising mounting structure for detachably fastening the cylinder to said vehicle support structure which compensates for variations in the orientation of the bumper structure with respect to the vehicle support structure, said mounting structure including a cylinder bracket fixedly secured to the cylinder, the cylinder bracket including at least one arm extending outwardly from the cylinder, said arm having an opening therein, a support bracket, the support bracket including a wall, the wall having a first cylinder opening therein of larger diameter than the cylinder, the vehicle support structure having a second cylinder opening therein of larger diameter than the cylinder, means detachably fastening the support bracket to the vehicle support structure with said first and second cylinder openings in substantial registry, the cylinder extending through the first and second cylinder openings at a location and angle limited by the diameters thereof, the means for detachably fastening the support bracket to the vehicle support structure including said wall having at least one vertically oriented elongated mounting opening therein, said vehicle support structure having at least one bracket opening therein, fastening means extending through said mounting opening and bracket opening to secure the cylinder bracket in place with the mounting opening permitting vertical adjustability of the cylinder bracket, said wall having at least one arm extending outwardly therefrom, said arm having a horizontally oriented elongated mounting opening therein, fastening means extending through the mounting opening in the support bracket arm and the opening in the cylinder bracket arm to secure the cylinder to the support bracket with the mounting opening in the support bracket arm permitting horizontal adjustability of the cylinder.

2. An assembly as set forth in claim 1, wherein the first cylinder opening has a larger diameter than the second cylinder opening thereby permitting minor displacement of the center of the first cylinder opening with respect to the center of the second cylinder opening to result in substantial registry while still providing an opening means for the cylinder to extend through which is of larger diameter than the cylinder.

3. An assembly as set forth in claim 1, wherein the elongated mounting opening in the support bracket arm is vertically wider than the fastening means extending therethrough to permit vertical adjustability of the cylinder.

4. An assembly as set forth in claim 1, wherein the cylinder bracket includes a pair of substantially parallel spaced apart arms extending outwardly from the cylinder from diametrically opposed sides of the cylinder in opposite directions, each of said arms having an opening therein, said wall of the support bracket having a pair of spaced apart substantially parallel arms extending outwardly therefrom in the same direction, each of said lastmentioned arms having a horizontally oriented elongated mounting opening therein, fastening means extending through the mounting opening in each support bracket arm and the opening in one of the cylinder bracket arms to secure the cylinder to the support bracket with the mounting openings in the support bracket arms permitting horizontal adjustability of the cylinder.

5. An assembly as set forth in claim 4, wherein the elongated mounting openings in the support bracket arms are vertically wider than the fastening means extending therethrough to permit vertical adjustability of the cylinder.

6. An assembly as set forth in claim 4, wherein the pair of arms extending outwardly from the cylinder are spaced apart a distance which is less than the distance that the arms extending outwardly from said wall of the support bracket are spaced apart, the pair of arms extending outwardly from the cylinder being received between the arms extending outwardly from said wall of the support bracket thereby permitting adjustability of said pairs of arms with respect to each other.

7. An assembly as set forth in claim 1, wherein the wall of the support bracket has two vertically oriented elongated mounting openings therein, said vehicle support structure having two bracket openings therein, fastening means extending through said mounting openings and bracket openings to secure the cylinder bracket in place with said mounting openings permitting vertical adjustability of the support bracket.

* * * * *